US012780552B2

(12) United States Patent
Iwahori et al.

(10) Patent No.: US 12,780,552 B2
(45) Date of Patent: Nov. 3, 2026

(54) UNMANNED DRIVING SYSTEM, CONTROL DEVICE, AND UNMANNED DRIVING METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 18/439,814

(22) Filed: Feb. 13, 2024

(65) Prior Publication Data

US 2024/0327122 A1 Oct. 3, 2024

(30) Foreign Application Priority Data

Mar. 29, 2023 (JP) ................................ 2023-052896
Oct. 23, 2023 (JP) ................................ 2023-181567

(51) Int. Cl.

*B62D 65/18* (2006.01)
*B65G 1/04* (2006.01)
*B65G 1/137* (2006.01)

(52) U.S. Cl.

CPC .......... *B65G 1/1375* (2013.01); *B62D 65/18* (2013.01); *B65G 1/0492* (2013.01)

(58) Field of Classification Search

CPC .... B65G 1/1375; B65G 1/0492; B62D 65/18; G05B 23/0289; G05B 2219/2637; G05D 1/249; G05D 1/6987; G05D 2105/45; G05D 2107/70; G05D 2109/10; G06Q 10/08

See application file for complete search history.

(56) References Cited

U.S. PATENT DOCUMENTS

2017/0320529 A1 11/2017 Nordbruch
2024/0152152 A1* 5/2024 Lopes de Aquino, Jr. .................. G05B 13/0265
2025/0199530 A1* 6/2025 Ohtsuka .................. G05D 1/69

FOREIGN PATENT DOCUMENTS

JP 2017-538619 A 12/2017
JP 2021-105804 A 7/2021

* cited by examiner

*Primary Examiner* — Rodney A Butler
(74) *Attorney, Agent, or Firm* — Oblon, McClelland, Maier & Neustadt, L.L.P.

(57) ABSTRACT

An unmanned driving system includes a moving object movable by remote control; a remote control unit to control the moving object, the remote control unit moving the moving object from a first place in a factory to a second place; an information acquisition unit to acquire information indicating that a predetermined number or more of other moving objects of the same type as the moving object and having an abnormality arrive at the second place within a predetermined period. When the information is acquired, the remote control unit moves the moving object that has not been started the second work to a third place in the factory, the third place being different from both the first place and the second place.

4 Claims, 12 Drawing Sheets

UNMANNED DRIVING SYSTEM, CONTROL DEVICE, AND UNMANNED DRIVING METHOD

CROSS REFERENCE TO RELATED APPLICATIONS

The patent application claims the priority based on Japanese Patent Applications No. 2023-052896 filed on Mar. 29, 2023, and No. 2023-181567 filed on Oct. 23, 2023, the disclosure of which are hereby incorporated by reference in their entireties.

BACKGROUND

Field

The present disclosure relates to an unmanned driving system, a control device, and an unmanned driving method.

There are known technologies for causing vehicles to run by automatic driving during vehicle production steps (for example, Japanese Patent Application Publication (Translation of PCT Application) No. 2017-538619).

In the production steps of moving objects such as vehicles, when a moving object is moved from a work place for a pre-step to a work place for a post-step by unmanned driving, a moving object having an abnormality may interfere with the post-step.

SUMMARY

The present disclosure may be realized by the following aspects.

(1) According to the first aspect of the present disclosure, an unmanned driving system is provided. This unmanned driving system comprises a moving object configured to be movable by remote control; a remote control unit configured to perform remote control for the moving object, wherein the remote control unit moves the moving object that has been finished a first work at a first place in a factory to a second place in the factory by the remote control, wherein the moving object is produced in the factory, wherein the second place is a place for performing a second work on the moving object; and an information acquisition unit configured to acquire information indicating that a predetermined number or more of another moving objects of the same type as the moving object and having an abnormality arrive at the second place within a predetermined period, wherein when the information acquisition unit acquires the information, the remote control unit moves the moving object that has not been started the second work to a third place in the factory, wherein the third place is different from both the first place and the second place.

According to the unmanned driving system of this aspect, when the predetermined number or more of moving objects having an abnormality arrive at the second place within the predetermined period, the moving object under remote control can be moved to the third place instead of the second place because the moving object under remote control may also have an abnormality. Therefore, it is possible to prevent the second work at the second place from being interfered with by the moving object having an abnormality.

(2) In the unmanned driving system of the above aspect, the third place may be a place where a third work to resolve abnormality in the moving object that has not been started the second work, and the remote control unit may move the moving object that has been finished the third work to the second place.

The unmanned driving system of this aspect is capable of moving the moving object in which the abnormality has been addressed at the third place to the second place by remote control.

(3) In the unmanned driving system of the above aspect, when the information acquisition unit acquires information indicating that a cause of the abnormality may have been resolved, the remote control unit moves the moving object that has not been started the second work to the second place.

The unmanned driving system of this aspect is capable of moving the moving object to the second place by remote control when the cause of the abnormality has been addressed.

(4) In the unmanned driving system of the above aspect, when the moving object that has not been started the second work moves to the third place via the second place, the remote control unit may notify the second place not to perform the second work on the moving object that moves via the second place.

The unmanned driving system of this aspect is capable of preventing the second work from being performed on the moving object that moves to the third place via the second place.

(5) In the unmanned driving system of the above aspect, the third place may be a place where a third work to resolve abnormality in the moving object that has not been started the second work, and when the moving object that has moved to the third place is moved to the second place, the remote control unit may notify the second place to perform the second work on the moving object that has moved to the third place.

The unmanned driving system of this aspect is capable of allowing the second work to be performed on the moving object in which abnormality has been addressed.

(6) According to the second aspect of the present disclosure, a control device is provided. This control device comprises a remote control unit configured to perform remote control for a moving object, wherein the moving object configured to be movable by remote control, wherein the remote control unit moves the moving object that has been finished a first work at a first place in a factory to a second place in the factory by the remote control, wherein the moving object is produced in the factory, wherein the second place is a place for performing a second work on the moving object; and an information acquisition unit configured to acquire information indicating that a predetermined number or more of another moving objects of the same type as the moving object and having an abnormality arrive at the second place within a predetermined period, wherein when the information acquisition unit acquires the information, the remote control unit moves the moving object that has not been started the second work to a third place in the factory, wherein the third place is different from both the first place and the second place.

According to the control device of this aspect, when the predetermined number or more of moving objects having an abnormality arrive at the second place within the predetermined period, the moving object under remote control can be moved to the third place instead of the second place because the moving object under remote control may also have an abnormality. Therefore, it is possible to prevent the second work at the second place from being interfered with by the moving object having an abnormality.

(7) According to the third aspect of the present disclosure, an unmanned driving method is provided. This unmanned driving method comprises moving a moving object by unmanned driving, wherein the moving the moving object that has been finished a first work at a first place in a factory to a second place in the factory, wherein the moving object is produced in the factory, wherein the second place is a place for performing a second work on the moving object; and acquiring information indicating that a predetermined number or more of another moving objects of the same type as the moving object and having an abnormality arrive at the second place within a predetermined period, wherein when the acquiring acquires the information, the moving moves the moving object that has not been started the second work to a third place in the factory, wherein the third place is different from both the first place and the second place.

According to the unmanned driving method of this aspect, when the predetermined number or more of moving objects having an abnormality arrive at the second place within the predetermined period, the moving object under unmanned driving can be moved to the third place instead of the second place because the moving object under unmanned driving may also have an abnormality. Therefore, it is possible to prevent the second work at the second place from being interfered with by the moving object having an abnormality.

(8) According to the fourth aspect of the present disclosure, a method for producing a moving object is provided. This method for producing a moving object comprises performing a first work on a moving object at a first place in a factory, wherein the first work is a work using production equipment; moving the moving object by unmanned driving, wherein the moving the moving object that has been finished the first work to a second place in the factory, wherein the moving object is produced in the factory, wherein the second place is a place for performing a second work on the moving object; acquiring information indicating that a predetermined number or more of another moving objects of the same type as the moving object and having an abnormality arrive at the second place within a predetermined period; and performing the second work on the moving object at the second place, wherein when the acquiring acquires the information, the moving moves the moving object that has not been started the second work to a third place in the factory, wherein the third place is different from both the first place and the second place.

According to the method for producing a moving object of this aspect, when the predetermined number or more of moving objects having an abnormality arrive at the second place within the predetermined period, the moving object under unmanned driving can be moved to the third place instead of the second place because the moving object under unmanned driving may also have an abnormality. Therefore, it is possible to prevent the second work at the second place from being interfered with by the moving object having an abnormality.

(9) According to the fifth aspect of the present disclosure, a moving object is provided. This moving object comprises a control unit configured to perform unmanned driving for the moving object, wherein the control unit moves the moving object that has been finished a first work at a first place in a factory to a second place in the factory by the unmanned driving, wherein the moving object is produced in the factory, wherein the second place is a place for performing a second work on the moving object; and an information acquisition unit configured to acquire information indicating that a predetermined number or more of another moving objects of the same type as the moving object and having an abnormality arrive at the second place within a predetermined period, wherein when the information acquisition unit acquires the information, the control unit moves the moving object that has not been started the second work to a third place in the factory, wherein the third place is different from both the first place and the second place.

According to the moving object of this aspect, when the predetermined number or more of moving objects having an abnormality arrive at the second place within the predetermined period, the moving object under unmanned driving can be moved to the third place instead of the second place because the moving object under unmanned driving may also have an abnormality. Therefore, it is possible to prevent the second work at the second place from being interfered with by the moving object having an abnormality.

The present disclosure may also be realized in various aspects other than the unmanned driving system, the control device, the unmanned driving method, the method for producing a moving object, and the moving object. For example, the present disclosure may also be realized in aspects as a moving object production system, a computer program, a storage medium storing a computer program, and the like.

DETAILED DESCRIPTION

A. First Embodiment

Figure 1A:
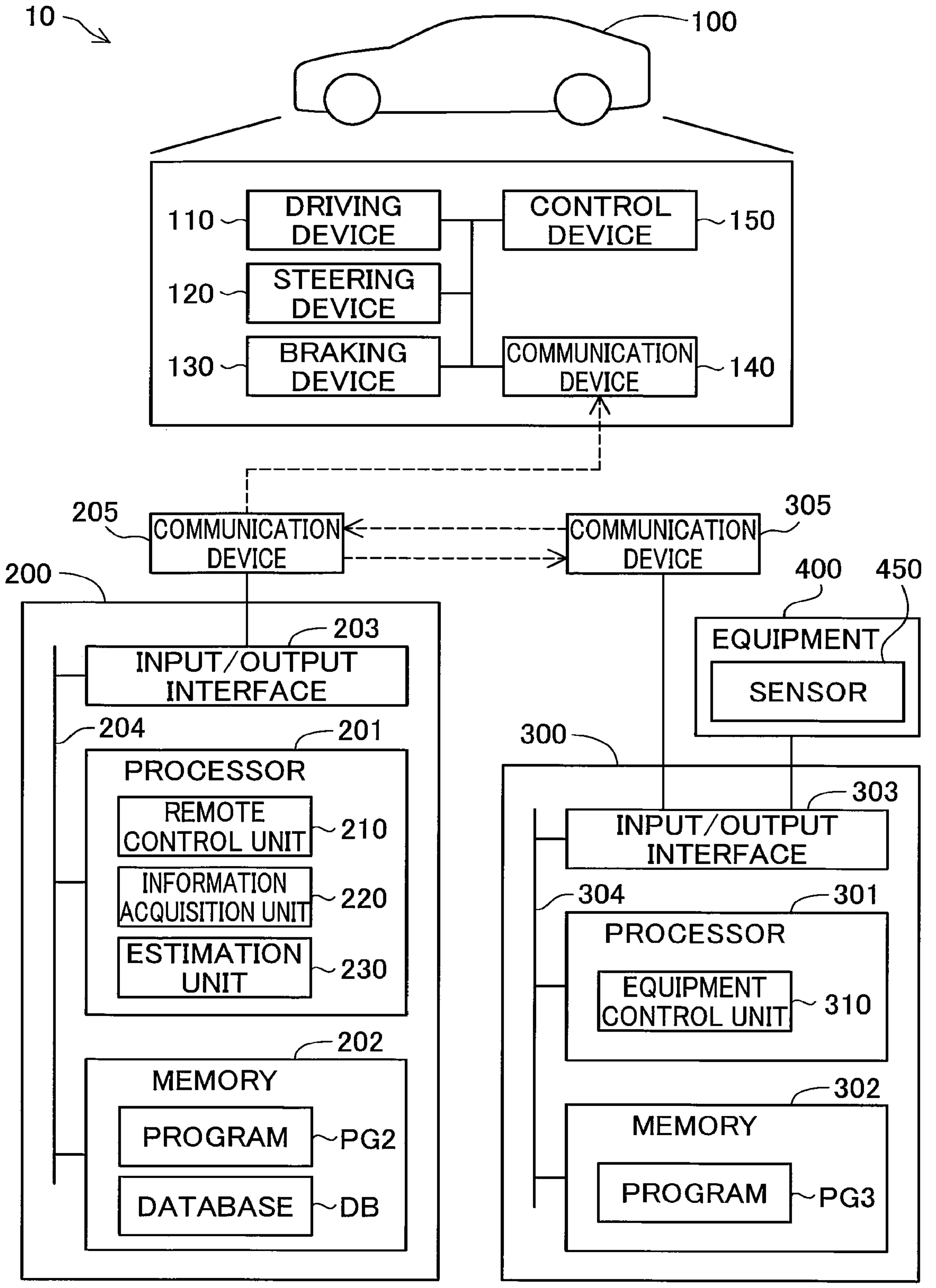
FIG. 1A is an explanatory view of a structure of an unmanned driving system of a first embodiment.

FIG. 1A is an explanatory view of a structure of an unmanned driving system 10 according to the first embodiment. The unmanned driving system 10 is used in factories for producing moving objects in order to move uncompleted moving objects, in other words, moving objects that are being manufactured, by unmanned driving.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

In the present embodiment, the unmanned driving system 10 includes a vehicle 100, which is a moving object, a remote control device 200, and a step management device 300. In the present embodiment, the vehicle 100 is configured to enable itself to run by remote control. The vehicle 100 is configured as an electric vehicle. The vehicle 100 includes a driving device 110 for accelerating the vehicle 100, a steering device 120 for changing the traveling direction of the vehicle 100, a braking device 130 for decelerating the vehicle 100, a communication device 140 for enabling communication with the remote control device 200 via wireless communication, and a vehicle control device 150 for controlling respective sections of the vehicle 100. In the present embodiment, the driving device 110 includes a battery, a motor driven by electric power of the battery, and driving wheels rotated by the motor.

Figure 1B:
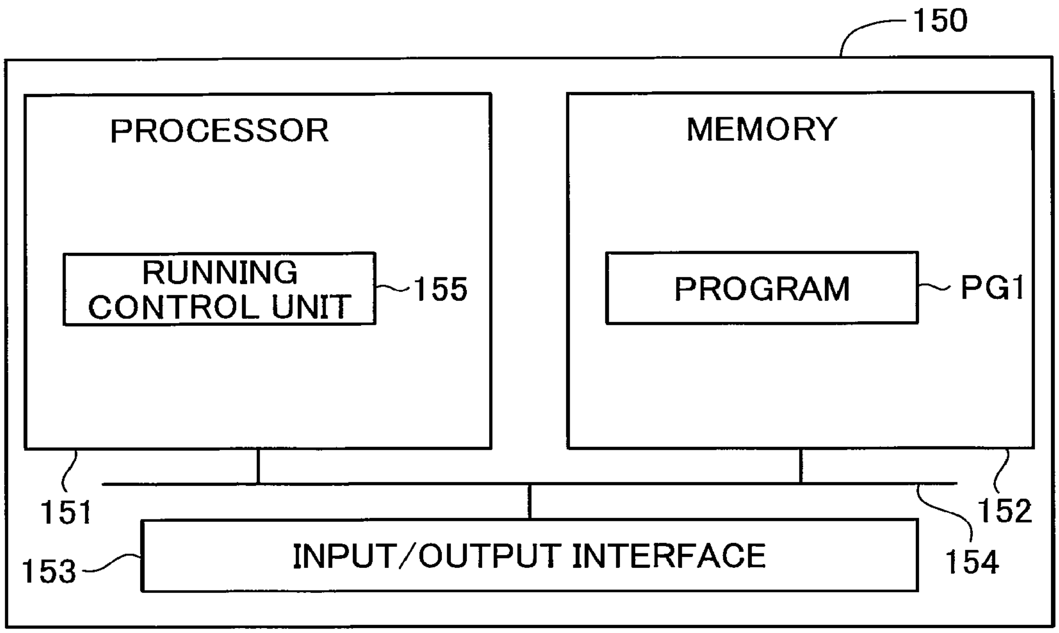
FIG. 1B is an explanatory view of a structure of a vehicle control device of the first embodiment.

FIG. 1B is an explanatory view of a structure of the vehicle control device 150. The vehicle control device 150 is constituted of a computer with a processor 151, a memory 152, an input/output interface 153, and an internal bus 154. The processor 151, the memory 152, and the input/output interface 153 are connected via the internal bus 154 to enable bidirectional communication. The input/output interface 153 is connected to the driving device 110, the steering device 120, the braking device 130, and the communication device 140. The processor 151 functions as a running control unit 155 that executes running control of the vehicle 100 by executing a computer program PG1 stored in advance in the memory 152. The "running control" means, for example, such as adjusting the acceleration, speed, steering angle, and the like of the vehicle 100. The running control unit 155 enables the vehicle 100 to run by executing running control, in other words, by controlling the driving device 110, the steering device 120, and the braking device 130. When the vehicle 100 has a passenger, the running control unit 155 is capable of enabling the vehicle 100 to run by controlling the various devices 110 to 130 in response to operations by the passenger. In the present embodiment, the running control unit 155 is capable of enabling the vehicle 100 to run by controlling the various devices 110 to 130 in response to control commands received from the remote control device 200, regardless of whether or not the vehicle 100 has a passenger. The vehicle control device 150 may simply be referred to as a control device, and the running control unit 155 may simply be referred to as a control unit.

The remote control device 200 shown in FIG. 1A is a control device for enabling remote control of the vehicle 100. The remote control device 200 is constituted of a computer with a processor 201, a memory 202, an input/output interface 203, and an internal bus 204. The processor 201, the memory 202, and the input/output interface 203 are connected via the internal bus 204 to enable bidirectional communication. The input/output interface 203 is connected to a communication device 205 for enabling communication with the vehicle 100, the step management device 300, and cameras CM1 to CM5, which are described later, via wireless communication. The communication device 205 may communicate with the vehicle 100 by wireless communication and may communicate with the step management device 300 and the cameras CM1 to CM5 by wired communication. The memory 202 may also be referred to as a storage unit. A computer program PG2 is stored in the memory 202. The processor 201 functions as the remote control unit 210, the information acquisition unit 220, and the estimation unit 230 by executing the computer program PG2. The remote control unit 210 enables the vehicle 100 to run by remote control of the vehicle 100. The information acquisition unit 220 acquires abnormality information. In the present embodiment, the abnormality information includes information indicating that an abnormality was detected at a predetermined frequency or more in the inspection of the vehicle 100. The estimation unit 230 estimates whether or not the vehicle 100 has an abnormality using the abnormality information. The remote control device 200 may also be simply referred to as a control device, and the remote control unit 210 may also be simply referred to as a control unit.

The step management device 300 is constituted of a computer with a processor 301, a memory 302, an input/output interface 303, and an internal bus 304. The processor 301, the memory 302, and the input/output interface 303 are connected via the internal bus 304 to enable bidirectional communication. The input/output interface 303 is connected to a communication device 305 for enabling communication with the remote control device 200 via wireless or wired communication. A computer program PG3 is stored in the memory 302. The processor 301 functions as an equipment control unit 310 by executing the computer program PG3. The equipment control unit 310 controls the production equipment 400 used for the production of the vehicle 100.

The equipment control unit 310 acquires information from a sensor 450 for detecting abnormalities in the production equipment 400.

Figure 2A:
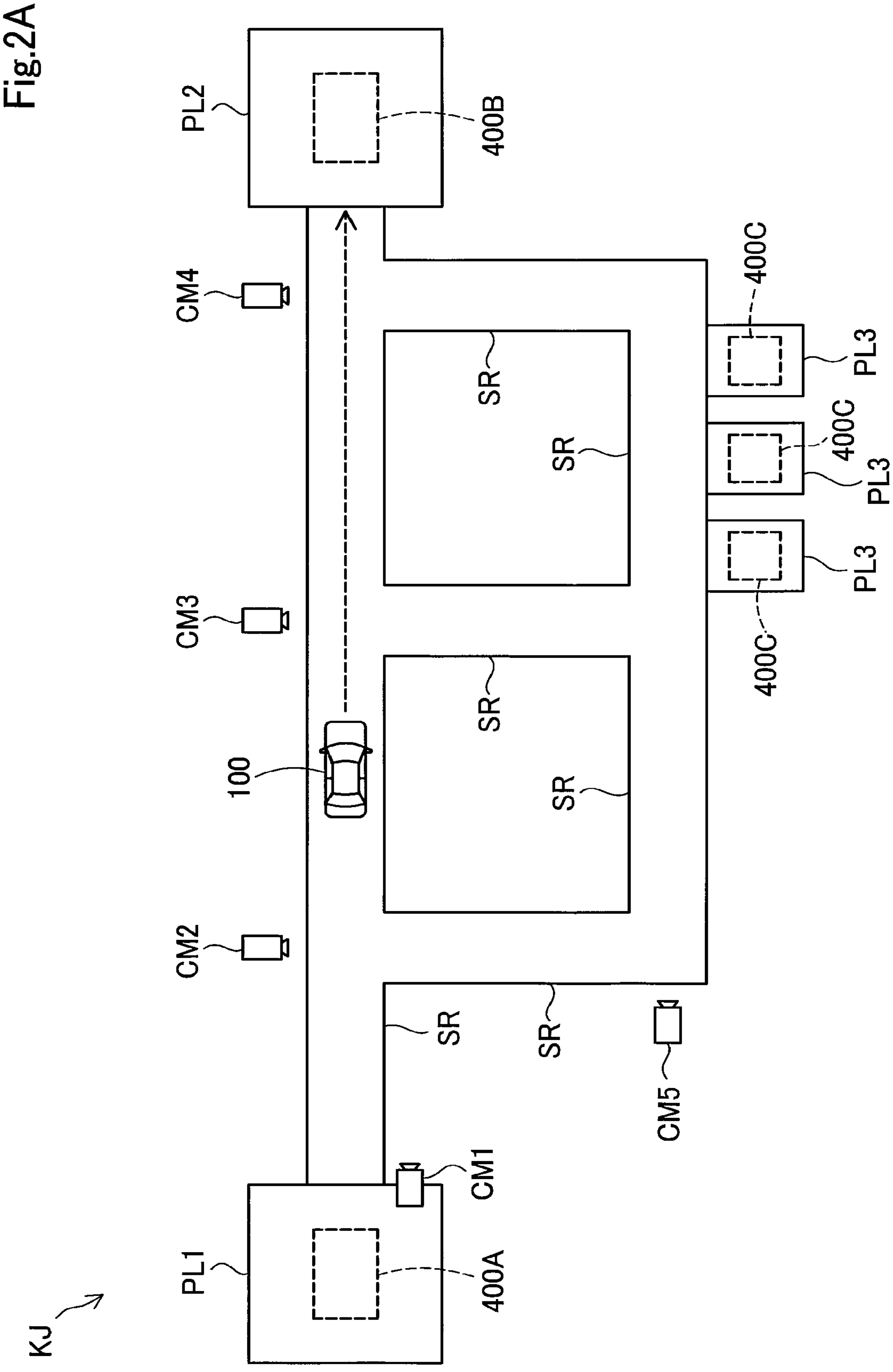
FIG. 2A is an explanatory view that schematically shows a structure of a factory.

FIG. 2A is an explanatory view that schematically shows a structure of a factory KJ. The factory KJ has a first place PL1 where a first work is performed, a second place PL2 where a second work is performed, and a plurality of third places PL3 where a third work is performed. The places PL1 to PL3 are connected to one another via a track SR on which the vehicle 100 can run. In the present embodiment, the first work is to assemble the vehicle 100, and the first place PL1 has an assembly equipment 400A as the production equipment 400 for assembling the vehicle 100. The second work is to inspect the vehicle 100, and the second place PL2 has an inspection equipment 400B as the production equipment 400 for inspecting the vehicle 100. The third work is to repair the vehicle 100, i.e., to address abnormalities in the vehicle 100, and each third place PL3 has a repair equipment 400C as the production equipment 400 for repairing the vehicle 100. The places PL1 to PL3 may be located in the same building or in different buildings in the same property. The places PL1 to PL3 may be located outdoors instead of indoors. The places PL1 to PL3 may be distributed across multiple properties. For example, the places PL1 to PL3 may be provided by being distributed in the first and second factories, which are adjacent to each other with a public or private road between them. In this case, the first and second factories together are referred to as the factory KJ, and the track SR may partially include a public road or a private road.

FIG. 2A illustrates the vehicle 100 running on the track SR by remote control using the remote control unit 210. Referring to FIG. 2A, the following provides a brief description of a method of causing the vehicle 100 to run by remote control using the remote control unit 210. First, the remote control unit 210 determines a target route for allowing the vehicle 100 to run to its destination along the track SR. In the present embodiment, the target route corresponds to the reference route, which is described later. The factory KJ is equipped with a plurality of cameras CM1 to CM5 that capture images of the track SR, and the remote control unit 210 can acquire the position and orientation of the vehicle 100 relative to the target route in real time by analyzing the video images captured by each of the cameras CM1 to CM5. In the following description, when the cameras CM1 to CM5 are described without being distinguished from one another, the cameras CM1 to CM5 will be simply referred to as the camera CM. The remote control unit 210 generates control commands for causing the vehicle 100 to run along the target route, and transmits the control commands to the vehicle 100. In the present embodiment, the control commands are running control signals, which are described later. The vehicle control device 150 mounted on the vehicle 100 controls the driving device 110, the steering device 120, and the braking device 130 according to the received control commands, thereby causing the vehicle 100 to run. In the present embodiment, the remote control unit 210 is capable of remote control of a plurality of vehicles 100 simultaneously and in parallel. In the case of performing remote control of a plurality of vehicles 100 simultaneously and in parallel, the remote control unit 210 transmits to each vehicle 100 a control command according to the target route and the current position and orientation of each vehicle 100. The method of causing the vehicle 100 to run by remote control may also be referred to as a remote automatic driving method or an unmanned driving method.

Figure 2B:
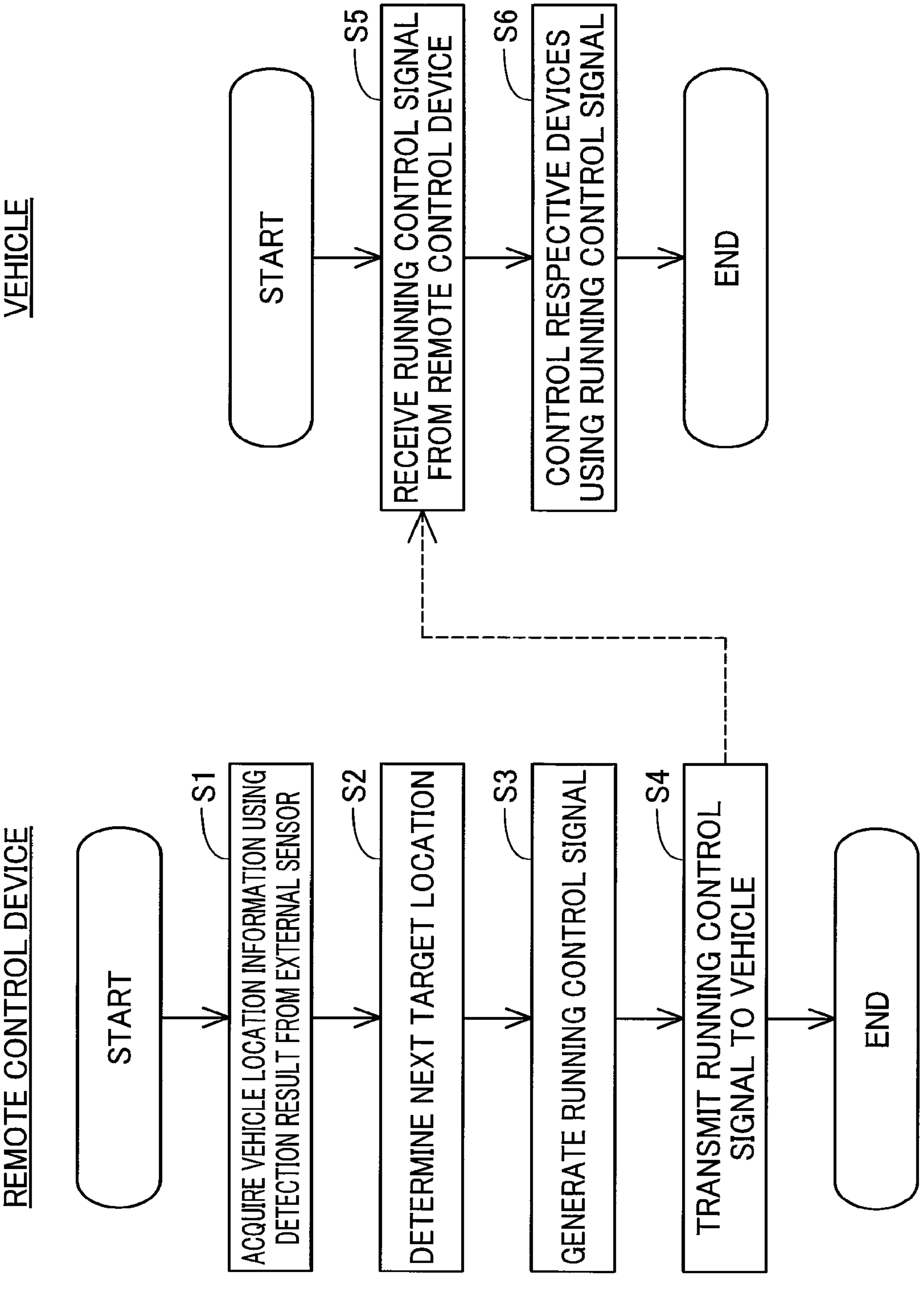
FIG. 2B is a flowchart of procedures of running control for a vehicle of the first embodiment.

FIG. 2B is a flowchart of procedures of running control for the vehicle 100 in the first embodiment. Referring to FIG. 2B, the following provides a detailed description of a method of causing the vehicle 100 to run by remote control using the remote control unit 210 of the remote control device 200. In the step S1, the remote control unit 210 acquires vehicle position information of the vehicle 100 using detection results output from an external sensor, which is a sensor located outside the vehicle 100. The vehicle position information is position information that serves as the basis for generating running control signals. In the present embodiment, the vehicle position information includes the position and orientation of the vehicle 100 in the reference coordinate system of the factory KJ. In the present embodiment, the reference coordinate system of the factory KJ is a global coordinate system, and any location in the factory KJ is expressed with X, Y, and Z coordinates in the global coordinate system. In the present embodiment, the external sensor is the camera CM, and the external sensor outputs a captured image as a detection result. That is, in the step S1, the remote control unit 210 acquires the vehicle position information using captured images acquired from the camera CM, which is an external sensor.

More specifically, in step S1, the remote control unit 210 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the unmanned driving system 10 or outside the unmanned driving system 10. The detection model is stored in advance in a memory 202 of the remote control device 200, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control unit 210 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control unit 210 determines a target location to which the vehicle 100 is to move next. In the present embodiment, the target location is expressed by X, Y, and Z coordinates in the global coordinate system. The memory 202 of the remote control device 200 contains a reference route stored in advance as a route along which the vehicle 100 is to run. The route is expressed by a node indicating a departure place, a node indicating a way point, a node indicating a destination, and a link connecting nodes to each other. The remote control unit 210 determines the target location to which the vehicle 100 is to move next using the vehicle location information and the reference route. The remote control unit 210 determines the target location on the reference route ahead of a current location of the vehicle 100.

In step S3, the remote control unit 210 generates a running control signal for causing the vehicle 100 to run toward the determined target location. In the present embodiment, the running control signal includes an acceleration and a steering angle of the vehicle 100 as parameters. The remote control unit 210 calculates a running speed of the vehicle 100 from transition of the location of the vehicle 100 and makes comparison between the calculated running speed and a target speed of the vehicle 100 determined in advance. If the running speed is lower than the target speed, the remote control unit 210 generally determines an acceleration in such a manner as to accelerate the vehicle 100. If the running speed is higher than the target speed as, the remote control unit 210 generally determines an acceleration in such a manner as to decelerate the vehicle 100. If the vehicle 100 is on the reference route, remote control unit 210 determines a steering angle and an acceleration in such a manner as to prevent the vehicle 100 from deviating from the reference route. If the vehicle 100 is not on the reference route, in other words, if the vehicle 100 deviates from the reference route, the remote control unit 210 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control unit 210 transmits the generated running control signal to the vehicle 100. The remote control unit 210 repeats the acquisition of vehicle location information, the determination of a target location, the generation of a running control signal, the transmission of the running control signal, and others in a predetermined cycle.

In step S5, the running control unit 155 of the vehicle 100 receives the running control signal transmitted from the remote control device 200. In step S6, the running control unit 155 controls the driving device 110, the steering device 120, and the braking device 130 using the received running control signal, thereby causing the vehicle 100 to run at the acceleration and the steering angle indicated by the running control signal. The running control unit 155 repeats the reception of a running control signal and the control over the various devices 110 to 130 in a predetermined cycle.

Figure 3:
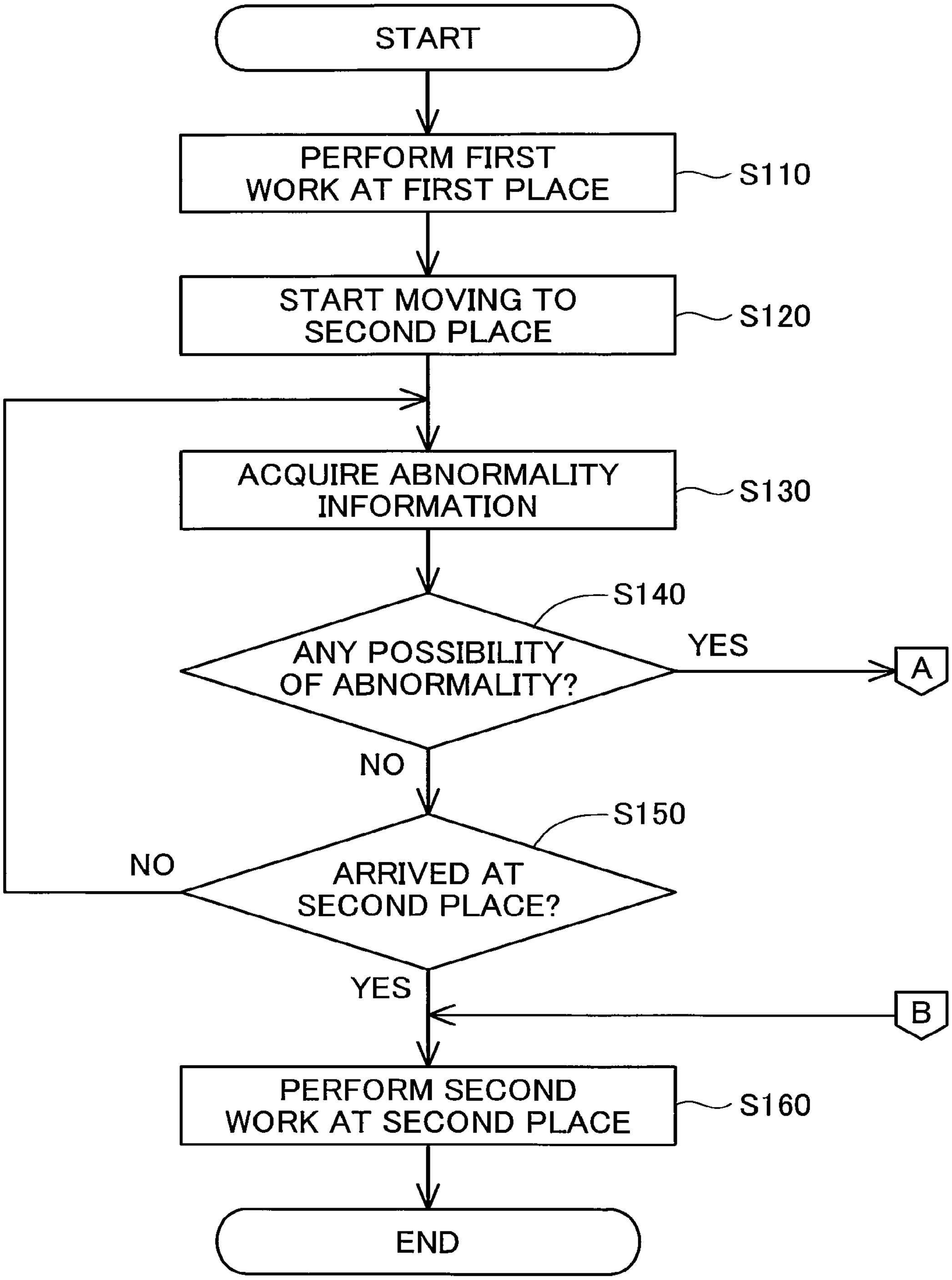
FIG. 3 is a first flowchart of contents of a vehicle production method.
Figure 4:
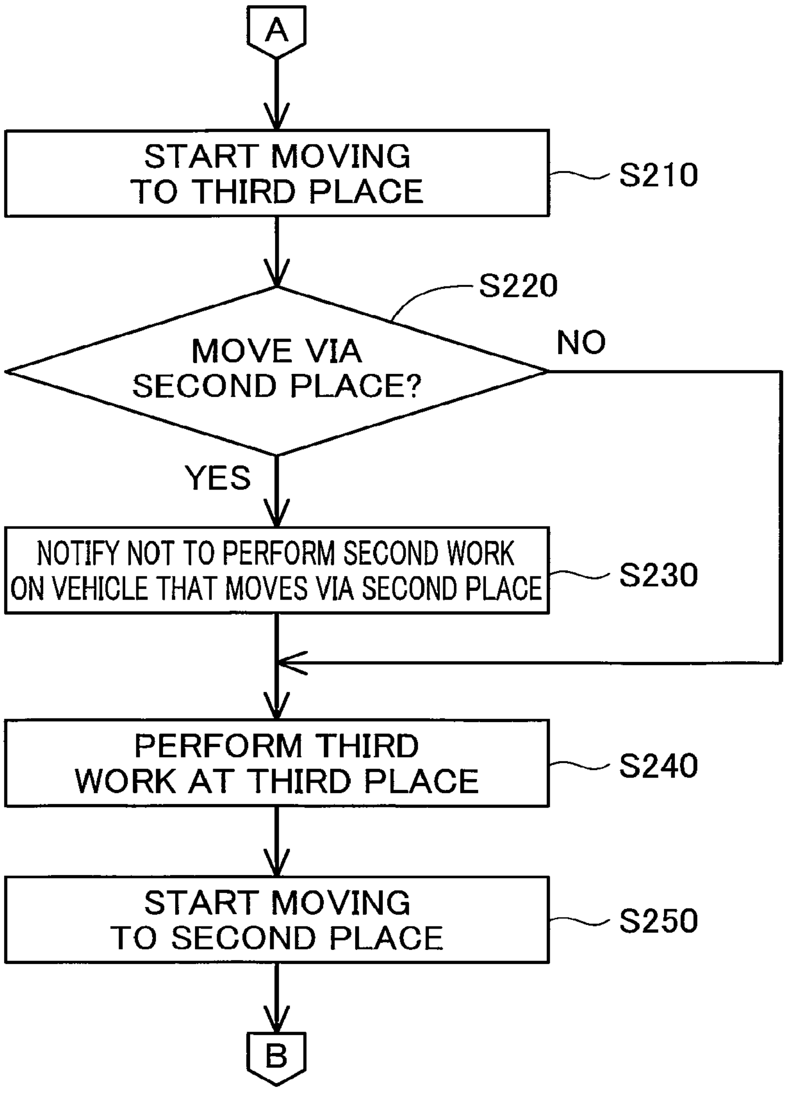
FIG. 4 is a second flowchart of contents of a vehicle production method.

FIG. 3 is a first flowchart showing contents of a method for producing the vehicle 100, and FIG. 4 is a second flowchart showing contents of a method for producing the vehicle 100. As the method for producing the vehicle 100 is started, at first, a first work is performed on the vehicle 100 at the first place PL1 as the step S110 in FIG. 3. In the present embodiment, the first work is a work for assembling the vehicle 100 using the assembly equipment 400A. The vehicle 100 having undergone the first work is ready to move by remote control. The state in which the vehicle 100 is capable of moving under remote control refers to a state in which the vehicle 100 is equipped with the driving device 110, the steering device 120, the braking device 130, the communication device 140, and the vehicle control device 150, so that the vehicle 100 is capable of exhibiting the three functions: running, turning, and stopping, by remote control. Therefore, at this point, at least some of the interior components, such as the driver's seat and dashboard, may not be installed in the vehicle 100, at least some of the exterior components, such as bumpers and fenders, may not be attached to the vehicle 100, and the vehicle 100 may not be equipped with a body shell.

In the step S120, the remote control unit 210 performs remote control of the vehicle 100 assembled by the first work, thereby initiating the movement of the vehicle 100 from the first place PL1 to the second place PL2. Prior to starting the remote control, the remote control unit 210 acquires an identification number of the vehicle 100 in which the remote control is to start, from the step management device 300.

In the step S130, the information acquisition unit 220 receives abnormality information from the step management device 300. The abnormality information indicates whether or not such an event that a predetermined number or more of other vehicles of the same type as the vehicle 100 and having an abnormality arrive at the second place PL2 within a predetermined period has occurred. In the present embodiment, the step management device 300 acquires inspection results from the inspection equipment 400B, and generates abnormality information using the inspection results. For example, if, in the inspection at the second place PL2, the same type of abnormality is not detected in two or more vehicles out of 10 vehicles that were most recently inspected, the step management device 300 transmits the abnormality information indicating that the above event has not occurred to the remote control device 200. If the same type of abnormality is detected in two or more vehicles out of 10 vehicles that were most recently inspected, the step management device 300 transmits the abnormality information indicating that the above event has occurred to the remote control device 200. The step management device 300 transmits the abnormality information indicating that the above event has occurred to the remote control device 200 until it receives information indicating that the cause of the abnormality has been addressed. In the present embodiment, the cause of the abnormality is investigated by workers. For example, an abnormality in the assembly equipment 400A may result in an abnormality in the vehicle 100 that has undergone the first work using the assembly equipment 400A. After the worker addresses the abnormality in the assembly equipment 400A, he/she transmits information indicating that the abnormality has been addressed to the step management device 300 via a tablet terminal or a similar device.

In the step S140, the estimation unit 230 estimates whether or not the vehicle 100 moving to the second place PL2 has an abnormality using the abnormality information acquired by the information acquisition unit 220. In the present embodiment, the estimation unit 230 estimates that the vehicle 100 moving to the second place PL2 has an abnormality when the abnormality information indicates occurrence of the above event, and estimates that the vehicle 100 moving to the second place PL2 has no abnormality when the abnormality information does not indicate occurrence of the above event.

When the estimation in the step S140 reports no occurrence of abnormality in the vehicle 100, the remote control unit 210 determines in the step S150 whether the vehicle 100 has arrived at the second place PL2. When the determination in the step S150 did not confirm the arrival of the vehicle 100 at the second place PL2, the remote control unit 210 continues to move the vehicle 100, and the process returns to the step S130 to acquire the latest abnormality information. When it is determined in the step S150 that the vehicle 100 has arrived at the second place PL2, the movement of the vehicle 100 by the remote control unit 210 is terminated, and the second work is performed on the vehicle 100 in the second place PL2 in the step S160. In the present embodiment, the second work is an inspection of the vehicle 100. The vehicle 100 that has passed the inspection becomes ready for shipment. In other words, in the present embodiment, the vehicle 100 is completed when it passes the inspection.

When it is estimated that the vehicle 100 has an abnormality in the step S140, the remote control unit 210 changes the transfer destination of the vehicle 100 from the second place PL2 to the third place PL3 in the step S210 in FIG. 4, determines a new target route from the current location to the third place PL3, and initiates the movement of the vehicle 100 from the current location to the third place PL3. In the present embodiment, a plurality of reference routes are stored in the memory 202. The remote control unit 210 determines a reference route, which is used as a new target route for the vehicle 100, according to the current location and the transfer destination of the vehicle 100. In the present embodiment, the remote control unit 210 determines a third place PL3 as the transfer destination from among the plurality of third places PL3 using a database DB stored in the memory 202. More specifically, the database DB stores information in which each type of the abnormality in the assembly equipment 400A is associated with a third place PL3 suitable for addressing the abnormality in the vehicle 100 caused by the abnormality in the assembly equipment 400A, and information in which the type of the abnormality in the vehicle 100 is associated with a third place PL3 suitable for addressing the abnormality in the vehicle, and the remote control unit 210 determines a third place PL3 suitable for addressing the abnormality in the vehicle 100 as the transfer destination from among the plurality of third places PL3. In the following description, the vehicle 100 that is estimated to have an abnormality is referred to as an estimated vehicle 100 or an estimated moving object.

In the step S220, the remote control unit 210 determines whether or not the estimated vehicle 100 moves to the third place PL3 via the second place PL2. The remote control unit 210 is capable of determining whether or not the estimated vehicle 100 moves to the third place PL3 via the second place PL2 by using the new target route. For example, if the estimated vehicle 100 has already passed the last intersection before the second place PL2, or if the estimated vehicle 100 has already entered into the building of the second place PL2, a new target route via the second place PL2 may be determined. If it is determined in the step S220 that the estimated vehicle 100 moves to the third place PL3 via the second place PL2, in the step S230, the remote control unit 210 notifies the second place PL2 via the equipment control unit 310 not to perform the second work on the estimated vehicle 100. The remote control unit 210 notifies workers in the second place PL2 not to perform the second work on the estimated vehicle 100, for example, via the equipment control unit 310, by displaying a text message on a display of the inspection equipment 400B or by outputting a voice message from a speaker of the inspection equipment 400B. If the second work is to be automatically performed by the inspection equipment 400B, the remote control unit 210 transmits a control command to the inspection equipment 400B via the equipment control unit 310 so as to notify the inspection equipment 400B not to perform the second work on the estimated vehicle 100. If it is not determined in the step S220 that the estimated vehicle 100 moves to the third place PL3 via the second place PL2, the step S230 is skipped and the process moves to the step S240.

After the estimated vehicle 100 arrives at the third place PL3, the third work is performed on the estimated vehicle 100 at the third place PL3 in the step S240. In the present embodiment, the third work is to repair the estimated vehicle 100. The work to repair the estimated vehicle 100 includes confirming whether or not there is an abnormality and addressing the abnormality. If there is an abnormality, the work to address the abnormality is performed; if no abnormality is detected, the work to address the abnormality is not performed. In the step S250, the remote control unit 210 initiates the movement of the estimated vehicle 100 from the third place PL3 to the second place PL2. At this time, the remote control unit 210 notifies the second place PL2 via the equipment control unit 310 to perform the second work on the vehicle 100 moving to the third place PL3. Then, the process moves to the step S160 in FIG. 3, and the second work is performed on the estimated vehicle 100. The estimated vehicle 100 that has passed the inspection becomes ready for shipment. Thereafter, the method for producing the vehicle 100 is completed. The step of performing the first work on the vehicle 100 at the first place PL1 may be referred to as a first work step, and the step of performing the second work on the vehicle 100 at the second place PL2 may be referred to as a second work step. Further, the step of moving the vehicle 100 by unmanned driving such as remote control may be referred to as an unmanned driving step, and the step of acquiring the abnormality information may be referred to as an information acquisition step.

Figure 5:
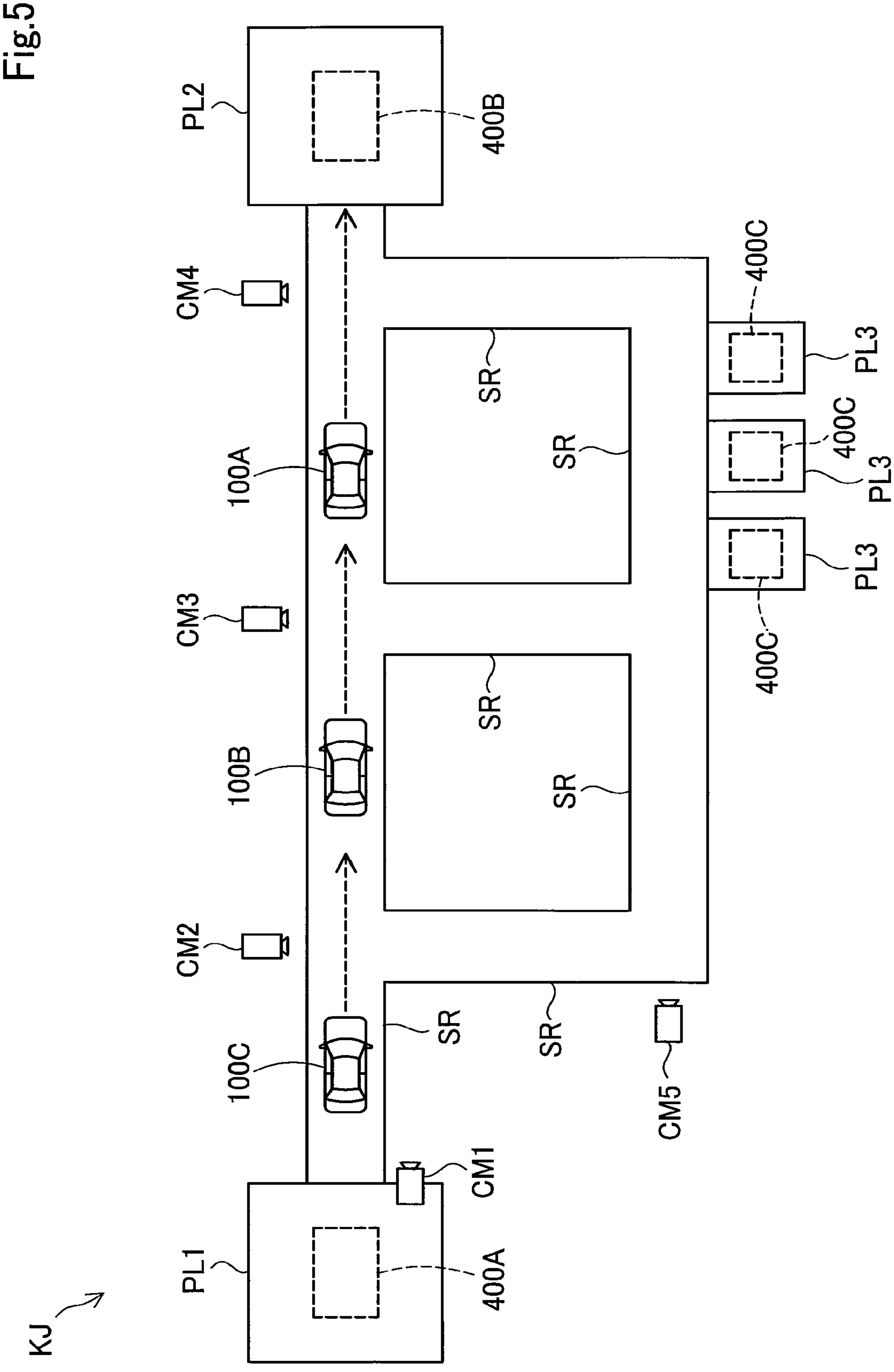
FIG. 5 is a first explanatory view of a state in which a vehicle runs by remote control.
Figure 6:
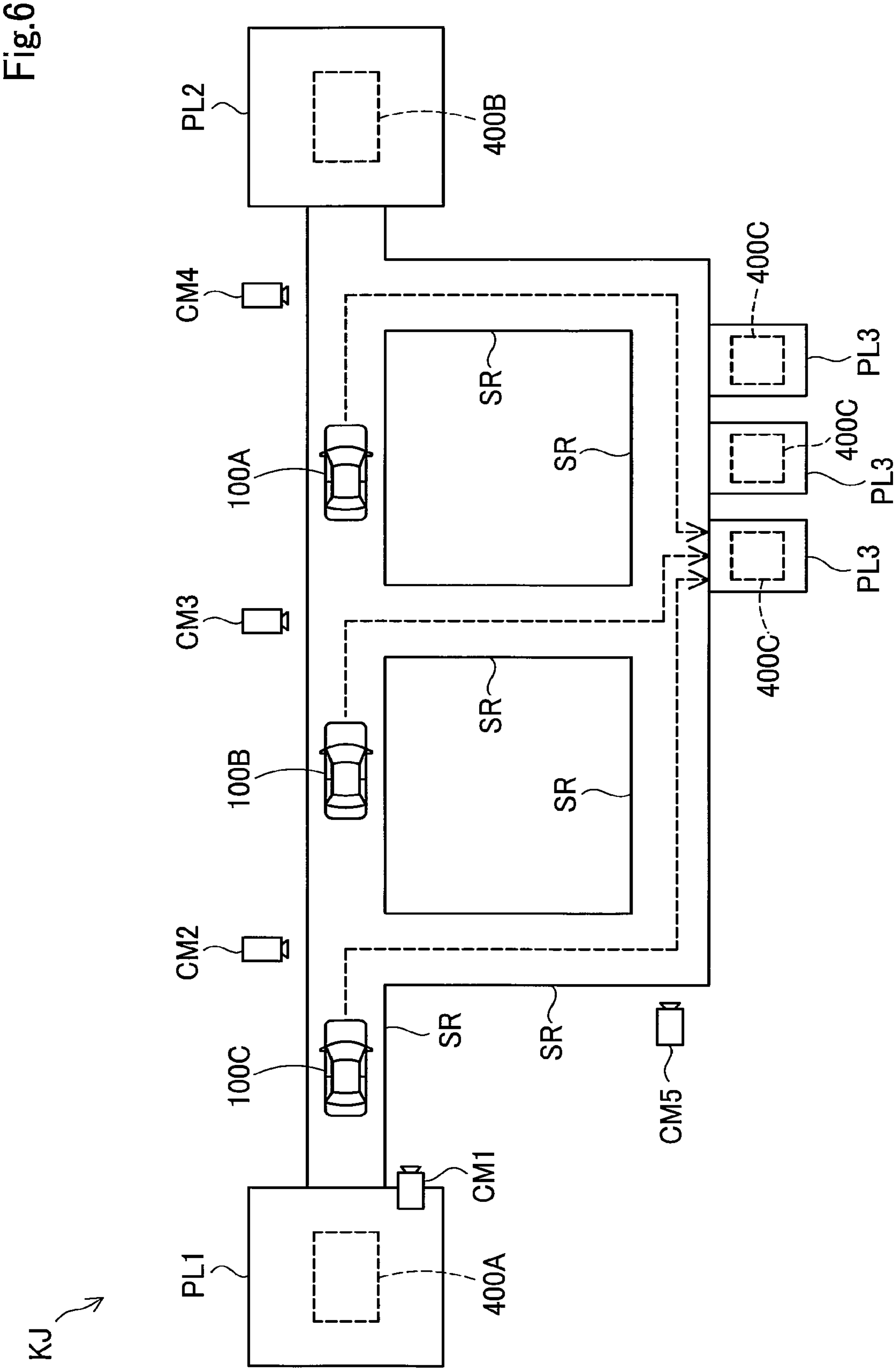
FIG. 6 is a second explanatory view of a state in which a vehicle runs by remote control.
Figure 7:
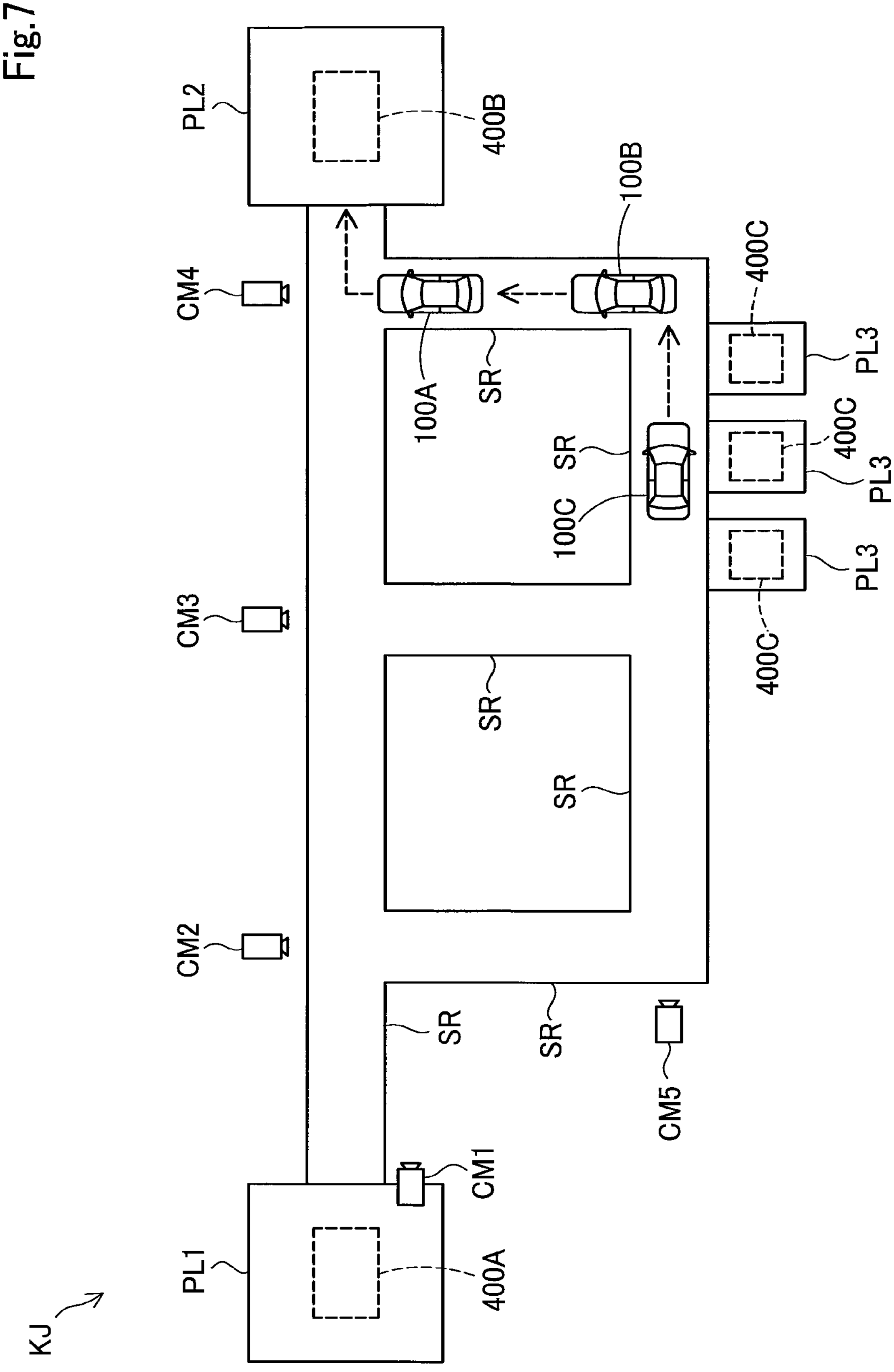
FIG. 7 is a third explanatory view of a state in which a vehicle runs by remote control.

FIG. 5 is a first explanatory view of a state in which the vehicle 100 runs by remote control, FIG. 6 is a second explanatory view of a state in which the vehicle 100 runs by remote control, and FIG. 7 is a third explanatory view of a state in which the vehicle 100 moves by remote control. FIGS. 5 to 7 show simultaneous and parallel remote control of three vehicles 100A to 100C. As shown in FIG. 5, if the event in which an abnormality is detected during the inspection of the vehicle 100 at the second place PL2 does not occur frequently, each of the vehicles 100A to 100C runs from the first place PL1 to the second place PL2 under remote control. As shown in FIG. 6, if the event in which an abnormality is detected during the inspection of the vehicle 100 at the second place PL2 occurs frequently, each of the vehicles 100A to 100C under remote control may also have an abnormality. Therefore, it is estimated that each of the vehicles 100A to 100C has an abnormality. Each of the vehicles 100A to 100C, which are estimated to have an abnormality, runs from its current location to the third place PL3 by remote control. As shown in FIG. 7, each of the vehicles 100A to 100C, which have been repaired at the third place PL3, runs from the third place PL3 to the second place PL2 by remote control.

According to the unmanned driving system 10 in the present embodiment described above, the vehicle 100 assembled at the first place PL1 can be moved by remote control to the second place PL2 where inspections are conducted, without using any transport device such as a crane or a conveyor. In particular, the present embodiment can move, among the vehicles 100 that have not undergone the inspection at the second place PL2, the vehicle 100 that is estimated to have an abnormality, to the third place PL3 instead of the second place PL2 by remote control. Therefore, it is possible to avoid performing unnecessary steps of conducting inspections on the vehicle 100 in which the possibility of an abnormality has already been found in advance.

Further, in the present embodiment, the vehicle 100 in which abnormalities have been addressed in the third place PL3 or no abnormalities have been detected can be moved to the second place PL2 without using any transport device such as a crane or a conveyor.

Further, in the present embodiment, since the third place PL3 as the transfer destination is determined from among a plurality of third places PL3 by using the database DB in which the type of the abnormality is associated with the third place PL3, the vehicle 100 can be moved to a third place PL3 suitable for addressing the abnormality from among the plurality of third places PL3. Therefore, the abnormality in the vehicle 100 can be addressed smoothly.

Further, in the present embodiment, in the case where the vehicle 100 that is estimated to have an abnormality moves to the third place PL3 via the second place PL2, the second place PL2 is notified not to perform the second work on the vehicle 100 that moves via the second place PL2. Therefore, it is possible to prevent the second work from being performed on the vehicle 100 with the abnormality of the vehicle 100 unaddressed.

B. Second Embodiment

Figure 8:
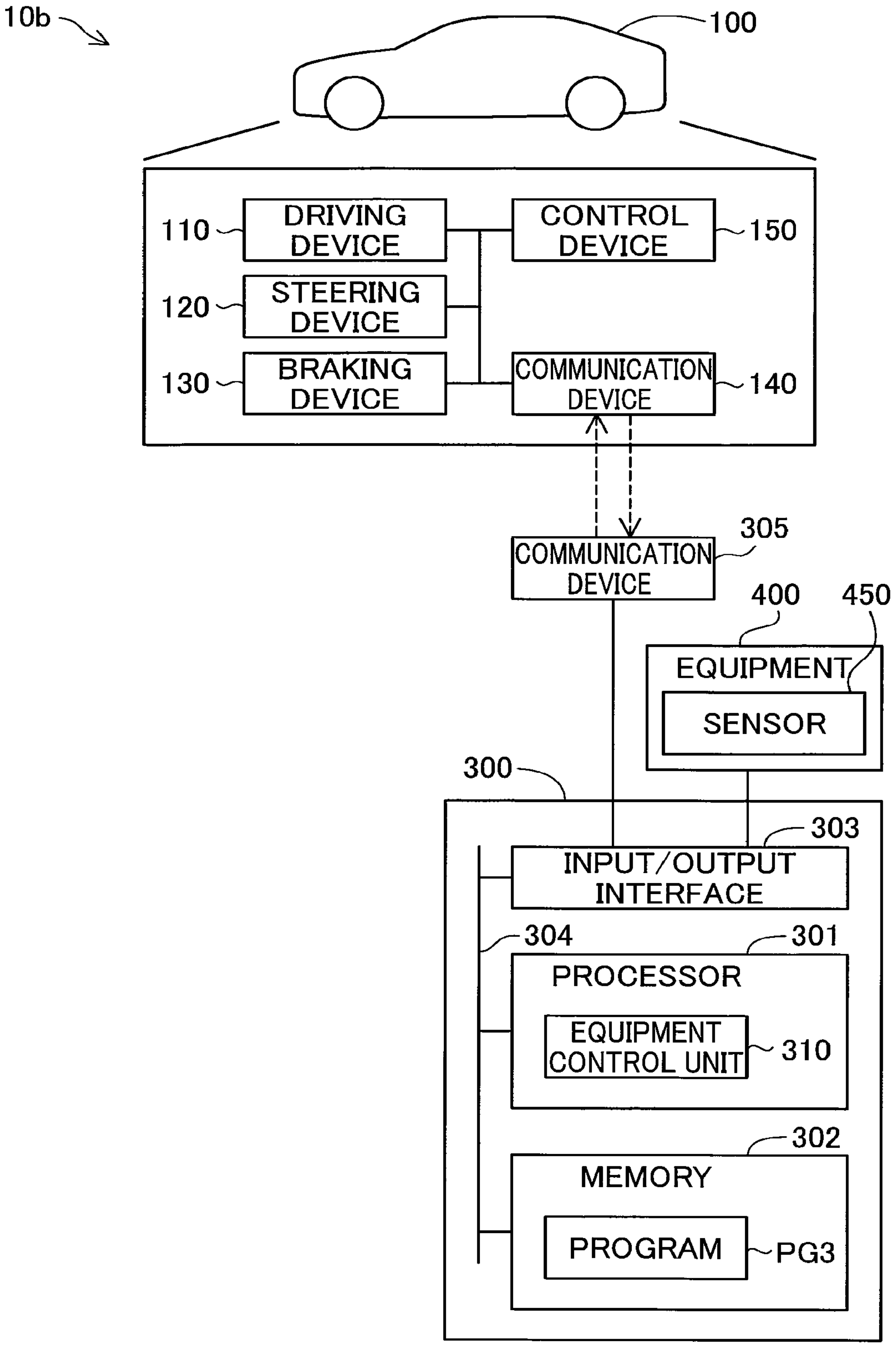
FIG. 8 is an explanatory view of a structure of an unmanned driving system of a second embodiment.
Figure 9:
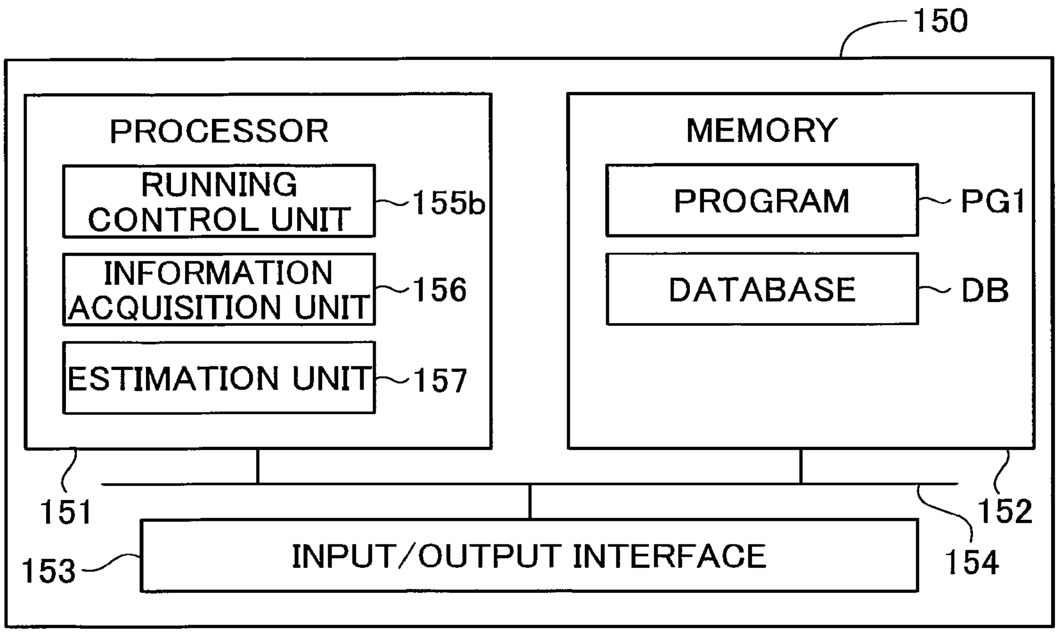
FIG. 9 is an explanatory view of a structure of a vehicle control device of the second embodiment.

FIG. 8 is an explanatory view that schematically shows a structure of an unmanned driving system 10*b* according to the second embodiment. FIG. 9 is an explanatory view of a structure of a vehicle control device 150 according to the second embodiment. As shown in FIG. 8, the second embodiment differs from the first embodiment in that the unmanned driving system 10*b* does not have the remote control device 200, and that the vehicle 100 runs by autonomous control instead of remote control. Other structures are the same as those in the first embodiment, unless otherwise specified. The method of causing the vehicle 100 to run by autonomous control may also be referred to as an autonomous automatic driving method or an unmanned driving method.

In the present embodiment, the vehicle 100 is configured to be capable of running by autonomous control. The vehicle 100 is capable of communication with the step management device 300 and the camera CM by wireless communication using the communication device 140. As shown in FIG. 9, in the present embodiment, the processor 151 of the vehicle control device 150 functions as the running control unit 155*b*, the information acquisition unit 156, and the estimation unit 157 by executing the computer program PG1 stored in advance in the memory 152. In the present embodiment, the running control unit 155*b* generates the running control signals by itself, and controls the driving device 110, the steering device 120, and the braking device 130 to cause the vehicle 100 to run by using the generated running control signals. The information acquisition unit 156 acquires the abnormality information, for example, from the step management device 300, in the same manner as in the information acquisition unit 220 of the remote control device 200 shown in FIG. 1A. The abnormality information includes information indicating that an abnormality was detected at a predetermined frequency or more in the inspection of other vehicles of the same type as the own vehicle. In the present embodiment, the abnormality information indicates whether or not such an event that a predetermined number or more of other vehicles of the same type as the own vehicle and having an abnormality arrive at the second place PL2 within a predetermined period has occurred. The estimation unit 157 estimates whether or not there is an abnormality in the own vehicle using the abnormality information in the same manner as in the estimation unit 230 of the remote control device 200 shown in FIG. 1A. The memory 152 stores the database DB, the reference route, the detection model, and the like, in advance. The running control unit 155*b* may be referred to simply as a control unit.

Figure 10:
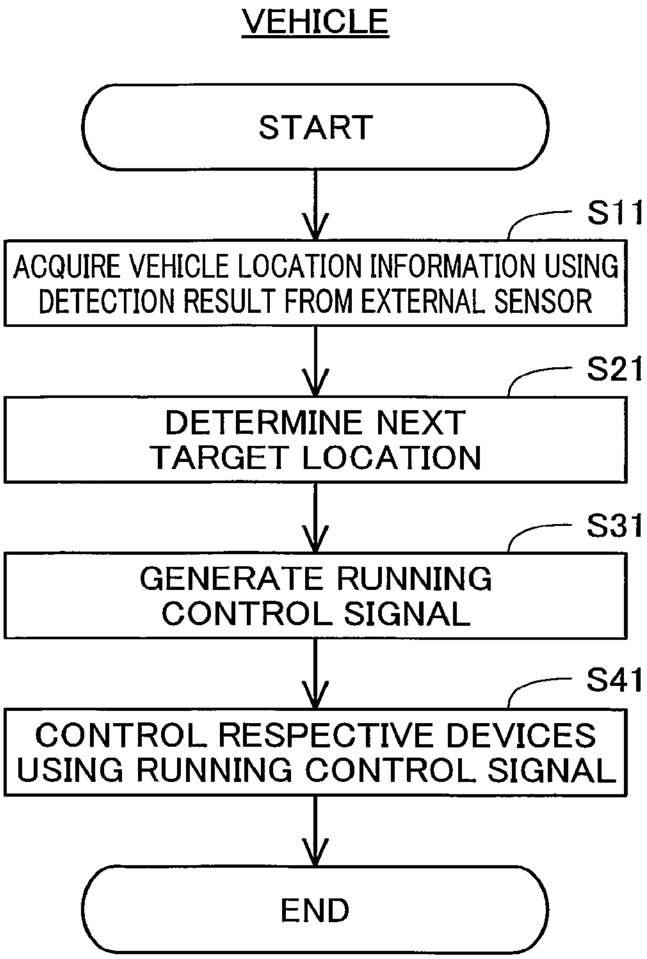
FIG. 10 is a flowchart of procedures of running control for a vehicle of the second embodiment.

FIG. 10 is a flowchart of procedures of running control for the vehicle 100 in the second embodiment. In the step S11, the running control unit 155*b* of the vehicle control device 150 acquires vehicle position information using the detection results output from the camera CM, which is an external sensor. In the step S21, the running control unit 155*b* determines the target location to which the vehicle 100 should go next. In the step S31, the running control unit 155*b* generates a running control signal for causing the vehicle 100 to run toward the determined target location. In the step S41, the running control unit 155*b* controls the driving device 110, the steering device 120, and the braking device 130 using the generated running control signal, thereby causing the vehicle 100 to run according to the parameters indicated by the running control signal. The running control unit 155*b* repeats the acquisition of the vehicle position information, the determination of the target location, the generation of the running control signal, and the control of the devices 110 to 130, in a predetermined cycle.

According to the unmanned driving system 10*b* in the present embodiment described above, the vehicle 100 that is estimated to have an abnormality can be moved to the third place PL3 instead of the second place PL2 by autonomous control. Therefore, it is possible to avoid performing unnecessary steps of conducting inspections on the vehicle 100 in which the possibility of an abnormality has already been found in advance.

C. Alternative Embodiments (C1) In the unmanned driving systems 10, 10*b* in each embodiment described above, the remote control unit 210 and the running control unit 155*b* move the vehicle 100 that has undergone the third work at the third place PL3 to the second place PL2. In contrast, the remote control unit 210 and the running control unit 155*b* may move the vehicle 100 that has undergone the third work at the third place PL3 to a place other than the second place PL2. Alternatively, the remote control unit 210 and the running control unit 155*b* may not have to move the vehicle 100 that has undergone the third work at the third place PL3 from the third place PL3. Also in this embodiment, it is possible to avoid performing unnecessary steps of conducting inspections on the vehicle 100 in which the possibility of an abnormality has already been found in advance.

(C2) In the unmanned driving systems 10, 10*b* in each embodiment described above, the remote control unit 210 and the running control unit 155*b* move the vehicle 100 from the first place PL1 to the second place PL2. In contrast, for example, after the vehicle 100 is transported from the first place PL1 to a place between the first place PL1 and the second place PL2 by a transport device such as a conveyor or a crane, the remote control unit 210 and the running control unit 155*b* may move the vehicle 100 from the place between the first place PL1 and the second place PL2 to the second place PL2.

(C3) In the unmanned driving systems 10, 10*b* in each embodiment described above, in the case where the vehicle 100 that is estimated to have an abnormality moves to the third place PL3 via the second place PL2, the remote control unit 210 and the running control unit 155*b* notify the second place PL2 not to perform the second work on the vehicle 100 that moves via the second place PL2. In contrast, in the case where the vehicle 100 that is estimated to have an abnormality moves to the third place PL3 via the second place PL2, the remote control unit 210 and the running control unit 155*b* may not have to notify the second place PL2 not to perform the second work on the vehicle 100 that moves via the second place PL2.

(C4) In the unmanned driving systems 10, 10*b* in each embodiment described above, the remote control unit 210 and the running control unit 155*b* determine a third place PL3 as the transfer destination of the vehicle 100 from among a plurality of third places PL3 using the database DB in which each type of abnormality and the third place PL3 are associated. In contrast, for example, the remote control unit 210 and the running control unit 155*b* may determine the third place PL3 closest to the current location of the vehicle 100 as the transfer destination of the vehicle 100 without using the database DB.

(C5) In each of the embodiments described above, the factory KJ includes a plurality of third places PL3. In contrast, the factory KJ may have only one third place PL3. In this case, the remote control unit 210 and the running control unit 155*b* may determine the transfer destination of the vehicle 100 without using the database DB.

(C6) In each of the embodiments described above, the remote control unit 210 and the running control unit 155*b* may move the vehicle 100 from the first place PL1 to the second place PL2 via a fourth place where a fourth work is performed. In this case, the remote control unit 210 and the running control unit 155*b* may move the estimated vehicle 100 that is estimated to have an abnormality from the first place PL1 to the fourth place via the third place PL3 and then move the estimated vehicle 100 from the fourth place to the second place PL2. Alternatively, the remote control unit 210 and the running control unit 155*b* may move the estimated vehicle 100 from the first place PL1 to the fourth place and then move the estimated vehicle 100 from the fourth place to the second place PL2 via the third place PL3. For example, if the second work performed at the second place PL2 is to inspect the water resistance of the vehicle 100 by pouring water on the vehicle 100, and the fourth work performed at the fourth place is to inspect scratches, etc. of the vehicle 100 without pouring water on the vehicle 100, the fourth work can be performed without any problem even if there is an abnormality that hinders window closing in the vehicle 100. Therefore, if an abnormality that hinders closing of the window of the vehicle 100 is detected before the vehicle 100 arrives at the fourth place, the remote control unit 210 and the running control unit 155*b* may first move the vehicle 100 from the first place PL1 to the fourth place and then move the vehicle 100 from the fourth place to the second place PL2 via the third place PL3.

(C7) In each of the embodiments described above, the second work performed at the second place PL2 is a work to inspect the vehicle 100. In contrast, the second work performed at the second place PL2 may be a work to attach a vehicle part to the vehicle 100. Since it may not be possible to attach a vehicle part to the vehicle 100 having an abnormality, if the second work is a work to attach a vehicle part to the vehicle 100, moving the vehicle 100 with the abnormality to the second place PL2 may interfere with the work of attaching the vehicle part in the second place PL2. However, according to the unmanned driving systems 10, 10*b* in each of the embodiments described above, the vehicle 100 that is estimated to have an abnormality is moved to the third place PL3 instead of the second place PL2 by remote control or autonomous control, thereby preventing interference with the work of attaching parts to the vehicle.

(C8) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The remote control device 200 and the vehicle 100 may acquire the vehicle location information through template matching using the three-dimensional point cloud data as the detection result and reference point cloud data, for example.

(C9) In the above-described first embodiment, the remote control device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 200 may acquire vehicle location information, determine a target location to which the vehicle 100 is to move next, and generate a route from a current location of the vehicle 100 indicated by the acquired vehicle location information to the target location. The remote control device 200 may generate a route to the target location between the current location and a destination or generate a route to the destination. The remote control device 200 may transmit the generated route to the vehicle 100. The vehicle 100 may generate a running control signal in such a manner as to cause the vehicle 100 to run along the route received from the remote control device 200 and control an actuator using the generated running control signal.

(2) The remote control device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C10) In the above-described embodiment in which the vehicle 100 can be running by autonomous control, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C11) In the above-described embodiment in which the vehicle 100 can be running by autonomous control, the vehicle 100 acquires vehicle location information using detection result from the external sensor. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control an actuator of the vehicle 100 using the generated running control signal. In this case, the vehicle 100 is capable of running without using any detection result from an external sensor. The vehicle 100 may acquire target arrival time or traffic congestion information from outside the vehicle 100 and reflect the target arrival time or traffic congestion information in at least one of the route and the running control signal. The functional configuration of the unmanned driving system 10 may be entirely provided at the vehicle 100. Specifically, the processes realized by the unmanned driving system 10 in the present disclosure may be realized by the vehicle 100 alone.

(C12) In the first embodiment described above, the remote control device 200 automatically generates the running control signal to be transmitted to the vehicle 100. In contrast, the remote control device 200 may generate the running control signal to be transmitted to the vehicle 100, according to an operation by an external operator located outside the vehicle 100. For example, the external operator may operate an operating device equipped with a display for displaying captured images output from the camera CM, which is an external sensor, a steering wheel, an accelerator pedal, and a brake pedal for enabling remote control of the vehicle 100, and a communication device for enabling communication with the remote control device 200 via wired or wireless communication, and the remote control device 200 may generate the running control signal in response to the operation made on the operating device. In this embodiment, if the transfer destination of the vehicle 100 is changed, the remote control device 200 may display information regarding the new transfer destination on the display of the operating device. In this case, the operator can refer to the information displayed on the display and cause the vehicle 100 to move toward the new transfer destination by unmanned driving. Further, in this embodiment, if the estimation unit 230 of the remote control device 200 estimates that the vehicle 100 that is moving has an abnormality, the remote control unit 210 may stop the unmanned driving and start remote automatic driving to cause the vehicle 100 to move toward the new transfer destination.

(C13) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C14) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed byjoining multiple parts in a moving object as a single component. The front module, the center module, or the rear module described above may be manufactured using Giga-casting, for example.

(C15) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. An unmanned driving system, comprising:

a moving object configured to be movable by remote control;

a remote control unit configured to perform the remote control for the moving object, wherein the remote control unit moves the moving object from a first place in a factory where a first work on the moving object is complete to a second place in the factory by the remote control, wherein the moving object is produced in the factory, and wherein the second place is a place configured to perform a second work on the moving object; and an information acquisition unit configured to acquire information indicating that a predetermined number or more of other moving objects arrived at the second place within a predetermined period, wherein the other moving objects are produced in the factory, wherein the other moving objects are configured to be movable by the remote control, and wherein the other moving objects have abnormalities, wherein when the information acquisition unit acquires the information, the remote control unit moves the moving object on which the second work has not started to a third place in the factory, wherein the third place is different from both the first place and the second place, and wherein the third place is a place configured to perform a third work to resolve an abnormality in the moving object on which the second work has not been started, wherein when the moving object on which the second work has not been started moves to the third place via the second place, the remote control unit notifies the second place not to perform the second work on the moving object, and wherein when the moving object that has moved to the third place moves to the second place, the remote control unit notifies the second place to perform the second work on the moving object that previously moved to the third place.

2. The unmanned driving system according to claim 1, wherein when the information acquisition unit acquires information indicating that a cause of the abnormality has been resolved, the remote control unit moves the moving object from the third place to the second place.

3. A control device, comprising:

a remote control unit configured to perform remote control for a moving object, wherein the moving object configured to be movable by the remote control, wherein the remote control unit moves the moving object that from a first place in a factory where a first work on the moving object is complete to a second place in the factory by the remote control, wherein the moving object is produced in the factory, and wherein the second place is a place configured to perform a second work on the moving object; and an information acquisition unit configured to acquire information indicating that a predetermined number or more of other moving objects arrived at the second place within a predetermined period, wherein the other moving objects are produced in the factory, wherein the other moving objects are configured to be movable by the remote control, and wherein the other moving objects have abnormalities, wherein when the information acquisition unit acquires the information, the remote control unit moves the moving object on which the second work has not started to a third place in the factory, wherein the third place is different from both the first place and the second place, and wherein the third place is a place configured to perform a third work to resolve an abnormality in the moving object on which the second work has not been started, wherein when the moving object on which the second work has not been started moves to the third place via the second place, the remote control unit notifies the second place not to perform the second work on the moving object, and wherein when the moving object that has moved to the third place moves to the second place, the remote control unit notifies the second place to perform the second work on the moving object that previously moved to the third place.

4. An unmanned driving method, comprising:

moving a moving object by unmanned driving including moving the moving object from a first place in a factory where a first work on the moving object is complete to a second place in the factory, wherein the moving object is produced in the factory, and wherein the second place is a place configured to perform a second work on the moving object; and acquiring information indicating that a predetermined number or more of other moving objects arrived at the second place within a predetermined period, wherein the other moving objects are produced in the factory, wherein the other moving objects are configured to be movable, and wherein the other moving objects have abnormalities, when the information is acquired, moving the moving object on which the second work has not started to a third place in the factory, wherein the third place is different from both the first place and the second place, and wherein the third place is a place configure to perform a third work to resolve an abnormality in the moving object on which the second work has not been started, when the moving object on which the second work has not been started moves to the third place via the second place, notifying the second place not to perform the second work on the moving object, and when the moving object that has moved to the third place moves to the second place notifying the second place to perform the second work on the moving object that previously moved to the third place.

* * * * *